(12) United States Patent
Lee

(10) Patent No.: US 6,384,305 B1
(45) Date of Patent: *May 7, 2002

(54) METHOD AND APPARATUS FOR SENSING KEY MOVEMENT IN A MUSICAL KEYBOARD

(75) Inventor: Charles Raymond Lee, Placerville, CA (US)

(73) Assignee: Overture Music Systems, Inc., Orangevale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,862

(22) Filed: May 19, 1999

(51) Int. Cl.[7] ............... G10F 1/02; G10G 3/04
(52) U.S. Cl. ............. 84/21; 84/462; 84/DIG. 7
(58) Field of Search .............. 84/2, 3, 21, 22, 84/115, 462, 658, 688, DIG. 7, 423 R

(56) References Cited

U.S. PATENT DOCUMENTS

| | | | | |
|---|---|---|---|---|
| 2,627,777 A | * | 2/1953 | Robbins | 84/413 R X |
| 3,582,530 A | * | 6/1971 | Adachi | 84/688 |
| 3,590,134 A | * | 6/1971 | Ogi | 84/688 |
| 3,594,488 A | * | 7/1971 | Ohno | 84/688 |
| 3,617,600 A | | 11/1971 | Ohno | |
| 4,151,774 A | | 5/1979 | Klann | |
| 4,213,367 A | | 7/1980 | Moog | |
| 4,366,463 A | * | 12/1982 | Barker | 84/DIG. 7 |
| 4,782,734 A | * | 11/1988 | Rose | 84/413 R |
| 4,838,139 A | | 6/1989 | Fiori | |
| 5,237,123 A | * | 8/1993 | Miller | 84/21 |
| 5,237,125 A | | 8/1993 | Fields | |
| 5,451,708 A | * | 9/1995 | Fujiwara et al. | 84/21 |
| 5,567,902 A | | 10/1996 | Kimble | |
| 5,648,621 A | * | 7/1997 | Sasaki | 84/462 X |
| 5,783,765 A | * | 7/1998 | Muramatsu | 84/688 X |

* cited by examiner

*Primary Examiner*—Stanley J. Witkowski
(74) *Attorney, Agent, or Firm*—King and Schickli PLLC

(57) ABSTRACT

A method and apparatus for measuring and recording keyboard motion in which an array of magnets and sensors capture key movement with high accuracy. This method uses a non-contact sensing and assembly technique that requires no mechanical or electrical connections with the entire keyboard assembly, thus making installation and servicing easier, as there are no cables or other devices required to connect or remove from the keyboard. This method also uses a mathematical algorithm to adjust for sensor distance variation (from the sensor to the key), allowing for high accuracy over the entire keyboard. Finally, this method allows for sideways keyboard movement (soft pedal in grand and some vertical pianos), without affecting the sensor readings.

19 Claims, 6 Drawing Sheets

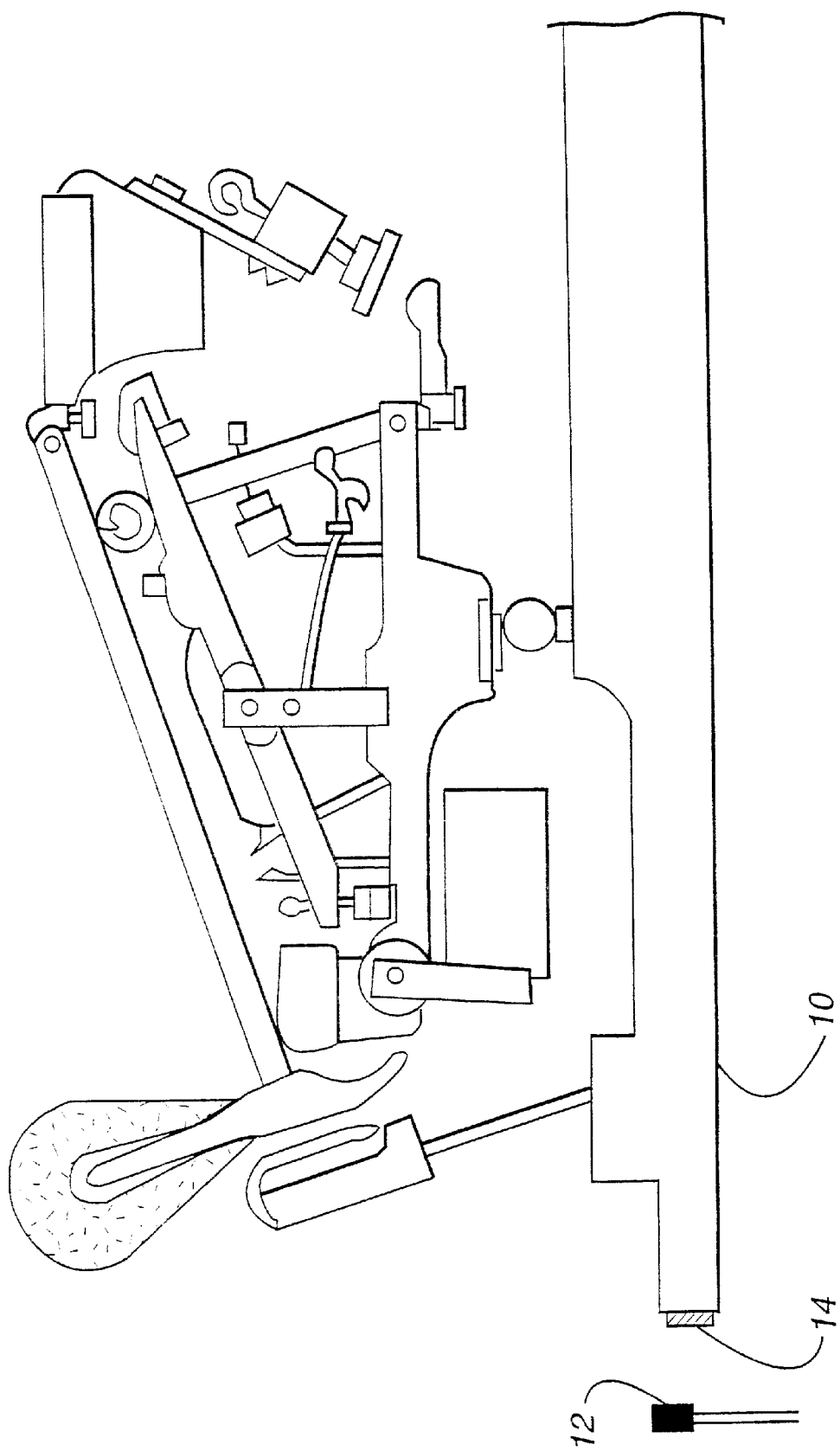

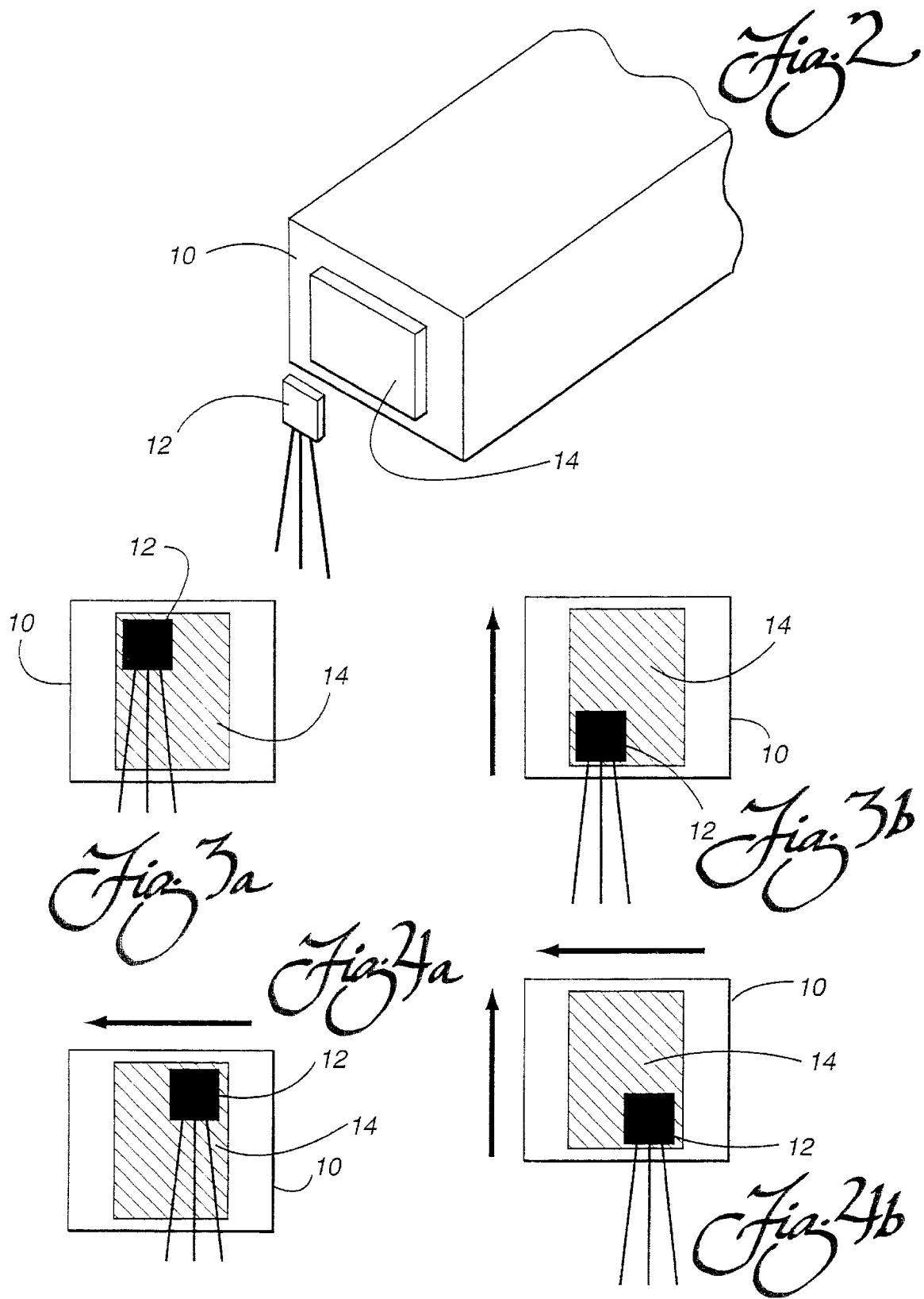

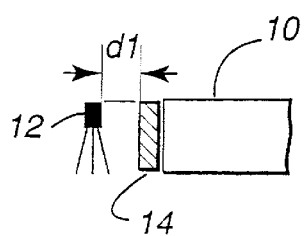
Fig. 7a
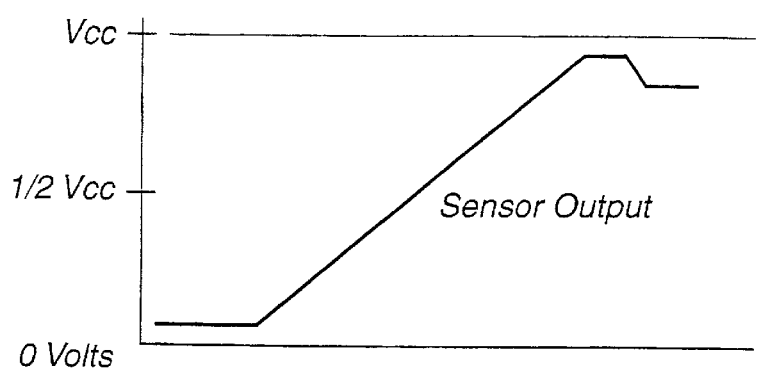
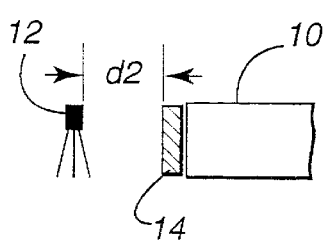
Fig. 7b
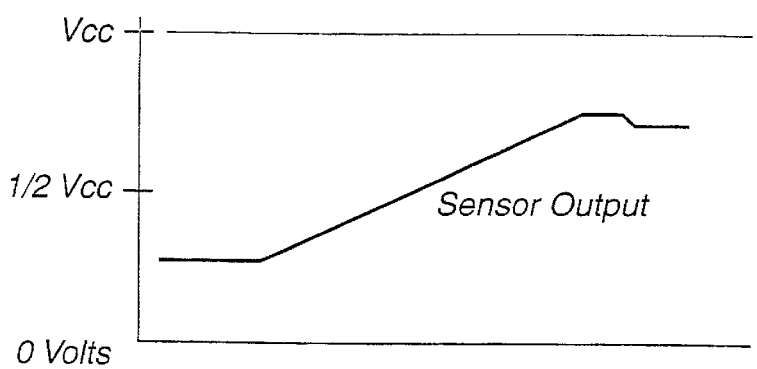
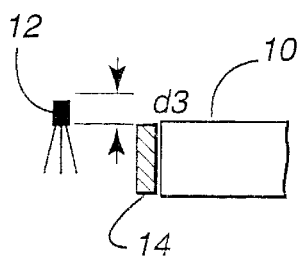
Fig. 7c
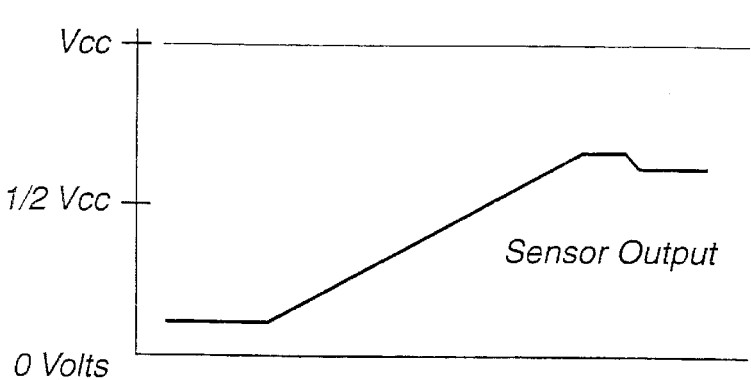
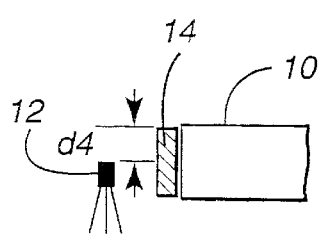
Fig. 7d
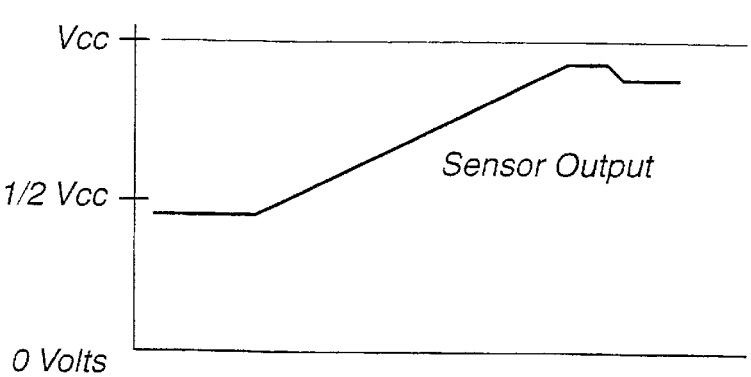

METHOD AND APPARATUS FOR SENSING KEY MOVEMENT IN A MUSICAL KEYBOARD

TECHNICAL FIELD

The present invention relates to the field of keyboard musical instruments, and more particularly to an apparatus and related method for accurately sensing key movement for recording.

BACKGROUND OF THE INVENTION

Generally musical performances can be recorded either for sound through analog audio recordings, or in a digital format such as Musical Instrument Digital Interface (MIDI) which stores the actual notes including velocities and duration of key movements in digital format. The MIDI standard has been around for several years, and is widely adopted by the music industry.

There are many devices on the market which allow the piano/keyboard to record MIDI output from a performance, most involve the use of photo-interrupters or optical reflective sensors to determine key velocity. A microprocessor (or microcontroller) is used to determine the time it takes for the key to travel between two distances, and translate the time to a given velocity. MIDI can be and is used as the main information to play notes as it can describe 127 different velocities (actually 128 if you include the "velocity" of the note not playing at all), for all the keys on the piano keyboard.

When using MIDI, there are several bytes of information that are transmitted every time a key is pressed or released. Generally, when a key is pressed, three bytes are transmitted including: (1) Note On; (2) Key Number; and (3) Velocity (of that key). Likewise, when a key is released, three additional bytes are transmitted including: (1) Note Off; (2) Key Number; and (3) Velocity (of the key being released).

Unfortunately for pianos and similar instruments, outfitting a keyboard to record key movements can be very difficult in view of the significant amount of wiring and cables required. Unlike electronic keyboards, pianos must have their mechanical action routinely regulated (serviced). This means that the keyboard and the adjoining keybed must be accessible for removal from the piano. If the piano is equipped with a recording device, all connections must be removed prior to removal of the keybed and work on the key action. This causes constant mechanical stress on the cables and connectors, and increases the likelihood that something will fail during or after the servicing process.

This invention substantially eliminates the above noted drawbacks of presently available devices by completely eliminating all mechanical or electronic connections between the keyboard/keybed and the rest of the musical instrument (strings and soundboard). As there is no physical connection between the two parts, the keyboard can be removed and replaced easily to and from the piano with no chance of any wires or cables breaking.

As an added benefit, an algorithm has been developed to allow any deficiency in mounting of the sensors to be corrected mathematically. This is important as not all 88 sensors will be absolutely identically installed on the piano's 88 keys. This algorithm will correct and adjust the physical variations of the sensor's mounting inside the piano.

SUMMARY OF THE INVENTION

Accordingly, it is a primary object of the present invention to provide a novel and improved apparatus and related method that are particularly adapted to sense key movement and determine velocity in a keyboard musical instrument for recording.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided an improved apparatus capable of sensing a movement and determining a velocity of a key of a keyboard musical instrument for recording. In accordance with the broadest teachings of the present invention, the device and related methods may be applied to digital pianos, electronic keyboards, or other musical devices that are capable of generating sounds by pressing a button or key. However, the description that follows will focus primarily on the invention as it pertains to an acoustic piano.

A standard piano keyboard has 88 keys and three foot pedals. The system described here pertains to recording both the keys and the pedals, though most discussion here will focus on key movement as it is more complex.

Key movement is generally in an up/down (vertical) direction. Total movement is about ½ inch (or 12 mm). In this case, movement is determined by use of a small magnet placed on the back end or rear portion of the key (underneath the hammers), and a magnetic sensor is placed across from and facing the magnet, but attached to the piano frame. The magnetic sensor can sense movement by the changing polarity of the magnet mounted on the key as it moves upward or downward. The magnet is preferably ½ inch (12 mm) or greater in length so the magnet is always present over the key. The sensor will output a voltage proportional to the polarity of the magnet that is currently directly over the sensor.

Keys can also shift slightly in the horizontal direction. This is especially true in grand pianos, where the "soft pedal" will cause a shift of approximately 3/16 inch (4 mm) to the side. The soft pedal is used quite often in music, and is necessary to record key movement while the key has shifted to the side. To account for this, the magnet used in this invention preferably has a width of ¼ inch (6 mm) or greater, so that as the key shifts sideways, the magnet's position is still over the sensor (not to the side of it).

Magnets and magnetic sensors provide high stability over time, in varying temperature and humidity conditions. AlNiCo magnets, for instance, will loose only 3% of their strength in 100,000 hours (11.4 years). Magnetic sensors have almost no change at all over time. Heat and humidity problems for both devices are virtually non-existent. AlNiCo magnets, which were used for testing of this invention, will only demagnetize at temperatures over 500 degrees Fahrenheit.

Magnetic sensors in general require much less power than optical sensors. In fact, most magnetic sensors use 70% less power than their optical counterpart. This when multiplied by 88 keys and three pedals makes for a substantial power savings for the entire system. Because of the power savings, the magnetic sensors used in this invention can be left on continuously rather than being pulsed or multiplexed which is often required for optical sensors. By leaving the sensors on continuously, a voltage measurement can be made instantly at any given time, rather than having to wait for the sensor to warm-up.

Because of the unique placement of the magnet on the back side of the keys, and the sensor on the frame of the piano, there is no disconnection of any sort required to remove the piano action (keyboard/keybed) from the piano. The magnets stay with the keys, and the sensors (and associated electronics such as analog to digital converters, microcontrollers, and power supply in the present preferred embodiment) stay with the piano frame. This makes servicing (regulation) of the piano much easier.

Accordingly several advantages are offered by the present invention, including: (1) accuracy of recording is extremely accurate as sensors are unaffected by temperature, humidity or age; (2) sensor to sensor variation in magnetic sensors is much less than optical sensors, so there is much similarity between all 88 key sensors in the system; (3) low power means that sensors can be left on continuously, allowing for instant monitoring of key movements, i.e., no sensor "warm-up" period is required; (4) shifting of the keys in the horizontal direction (soft pedal) has no adverse effect on the recording of key movement; (5) self-calibration is automatic due to an embedded algorithm; (though sensors are highly accurate and reliable, the physical positioning of these sensors may vary slightly due to the person installing the 88 sensors, this algorithm will correct any minor variations); (6) unique mounting of magnets and sensors allows easy servicing of piano action; and (7) no effect on the feel of key as the weight of magnet is extremely small (less than 1%) compared to that of the key's weighting.

Still other objects of the present invention will become apparent to those skilled in this art from the following description wherein there is shown and described the preferred embodiments of this invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive

BRIEF DESCRIPTION OF THE DRAWINGS

FIG. 1 is a side elevational view of an acoustic grand piano mechanism showing the preferred magnet and sensor placement;

FIG. 2 is an illustrated view showing the preferred placement of the sensor and associated magnet in relation to the rear portion of the key;

FIGS. 3a and b illustrate the typical movement of the rear portion of the key and the magnet relative to the sensor;

FIGS. 4a and 4b illustrate the possible side-to-side movement of the rear portion of the key relative to the sensor;

FIG. 7a is a graphical representation of the sensor output when optimally positioned relative to the magnet and key (shown here at rest);

FIG. 7b is a graphical representation of the sensor output when the sensor is positioned further away (than the ideal position) relative to the magnet and key;

FIG. 7c is a graphical representation of the sensor output when the sensor position is too low relative to the magnet and key;

FIG. 7d is a graphical representation of the sensor output when the sensor position is too high relative to the magnet and key;

DESCRIPTION OF THE PREFERRED EMBODIMENTS

Referring to the FIG. 1 shows an apparatus for measuring the relationship of the key 10 to the sensor 12. The sensor 12 is magnetic, sometimes referred to as a "hall effect sensor", and senses key movement as a magnet 14 moves past the sensor 12.

The magnet 14 is polarized in the vertical direction. As the key 10 moves upwards, the polarity that the sensor 12 detects gradually changes from one polarity to the other. This method is often referred to as the "slide-by" method of measuring magnetic strength and polarity. The advantage of this method is that the sensor remains in one magnetic field (unaffected by adjacent keys), and also gives an almost full range output from the sensor (the other type of sensing—known as "head-on" gives only ½ full range of output). More output means better resolution of key movement.

Referring to FIG. 2 shows a three dimensional view of the back side of the key 10, the magnet 14 mounted to the backside of the key, and the relationship of the sensor 12 to both the magnet and the key. The key 10 moves in a vertical direction in front of the sensor 12, while the sensor remains stationary.

In the examples to follow, the south pole of the magnet 14 is on the upper side, and the north pole of the magnet is on the lower side. This gives an increasing voltage as the key 10 and magnet 14 rise upwards. Reversing the poles (flipping the magnet over) inverts the sensor output, but in no way changes the patent issues covered within this document.

FIG. 3a shows the key 10 at rest in front of the sensor 12. As the key 10 moves upward as shown in FIG. 3b, the magnet 14 moves in front of the sensor 12, and the polarity of the magnet that the sensor detects, also changes with the movement. The polarity gradually shifts from the south pole to the north pole, and the corresponding voltage output changes with the voltage.

Note that the sensor 12 is positioned on the left side of the magnet 14 on the key 10. This is done to account for the fact that the key 10 can shift sideways when the soft pedal is pushed. This is shown in FIGS. 4a and b. At rest the key 10 can move 3/16" (4 mm) sideways when the soft pedal is pressed. When the key 10 is pressed while the soft pedal is also pressed, the key will move upwards, but physically shifted to the left (looking from the backside of the piano) as shown in FIG. 4b. This is why for this invention, the most preferred magnet 14 has a width of ¼" (6 mm) or greater to account for this shift. When the soft pedal is released, the key 10 will return to it's normal position, and the sensor 12 will be aligned over the left side of the magnet again.

Figure 5:
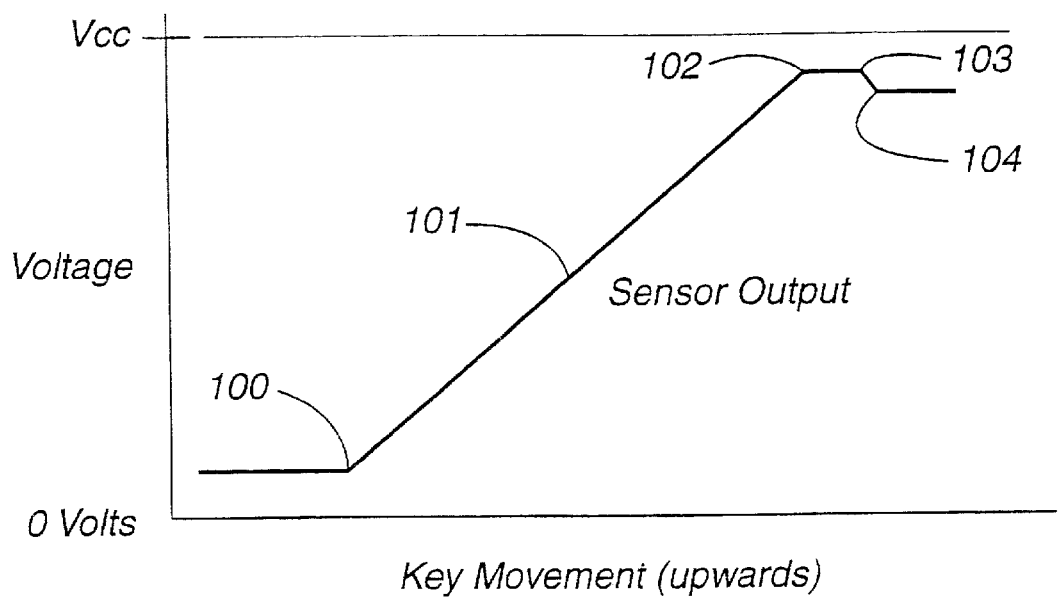
FIG. 5 is a graphical representation of a typical sensor output when a key is actuated (rear portion of the key raised)

Referring to FIG. 5 shows a typical output of the sensor 12 while a key 10 is being pressed. The key 10 is at rest, until at 100, where it first starts traveling upwards in front of the sensor 12. As the key 10 moves, the south pole of the magnet 14 gradually gets weaker as it shifts towards the north pole. At midway 101, the strength of the poles are about equal, and the sensor 12 detects no field, as the south pole and north pole cancel each other out. It is at this point that the sensor 12 outputs ½ Vcc (the supply voltage), which is also the same voltage it outputs if there was not magnetic field at all.

As the magnet 14 continues sliding by the sensor 12, the north pole has the dominant strength, and becomes stronger until the key 10 if fully pressed 102 with the north pole directly over the sensor. This gives the highest voltage output from the sensor 12.

Due to the mechanical nature of the key 10, the key enters a "backcheck" 103 mode, where the key moves slightly downwards, causing a slight shift in the output shown at 104. This slight shift in output can be used to further evaluate the key's position, and how it is being played.

Figure 6:
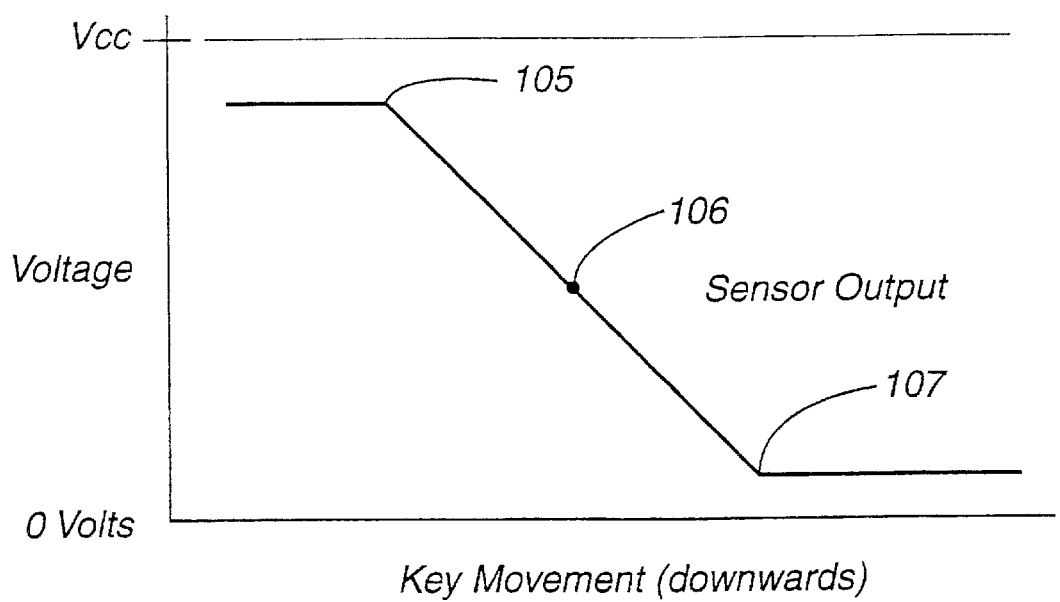
FIG. 6 is a graphical representation of a typical sensor output when a key is released (rear portion of a key lowered)

Referring to FIG. 6, the diagram shows the process of the key 10 being released. At 105 the key 10 starts it's downward movement from the backcheck position (on electronic keyboards, there would be no backcheck position). As the polarity of the magnet 14 changes from the north pole to the south pole, it cross the intermediated point 106 where both fields cancel each other out (again at ½ Vcc output). Beyond this point, the south pole of the magnet 14 has the greater strength, and gradually increases until at 107 the key 10 is fully released and the sensor 12 sits over the south pole of the magnet 14.

Due to the mechanical nature of the installation of the sensors, the sensor 12 may not be placed at the ideal position shown in FIG. 7a. It can be mounted further away from the key 10 than what it should be, or offset in a vertical direction (up or down). Because of the width of the magnet 14, a horizontal offset has no effect (unless it's well past the magnet).

In the ideal position FIG. 7a, the sensor 12 is placed correctly in both distance from the magnet 14, and over the end of the magnet where the south pole is the strongest. This gives the best output from the sensor 12.

If the sensor 12 is mounted further away from the magnet 14 as shown in FIG. 7b, the larger distance (d2) will cause the sensor 12 to detect a weaker magnetic field, and thus output a corresponding weaker signal. The shift in output is centered over ½ the supply voltage to the sensor (½ Vcc). As noted above, this point corresponds to a point where the south pole and north pole effectively cancel each other out leaving no effective polarity. It is both extremes of the output that get reduced as the sensor 12 is moved further away, with the sensor's output gradually compressing (seeing less magnetic field) towards the mid-point (½ Vcc—no magnetic field).

Another possibility is that the sensor 12 can be mounted too high (d3) as shown in FIG. 7c, which shifts the output of the sensor downwards, as the sensor will never see the full strength of the north pole. Likewise, the sensor 12 could be mounted too low (d4) as shown in FIG. 7d, giving a shifted output towards the higher voltages as the sensor never sees the full strength of the south pole.

These variations can be compensated by applying an algorithm to correct any offsets. Noting that ½ Vcc is the midway point (no magnetic field), and is also the center point of the key 10 traveling up or down, it is thus the known point of reference. Any full key movement must pass that point when the key 10 is midway.

An ideal response would have the voltage range from 0 volts to Vcc (the supply voltage). At rest, the sensor 12 output should be 0 volts, and during the highest point, the sensor should have the voltage of Vcc. With these three points (rest, midway, and fully depressed key), a formula can be applied to correct the shifted output.

Figure 8:
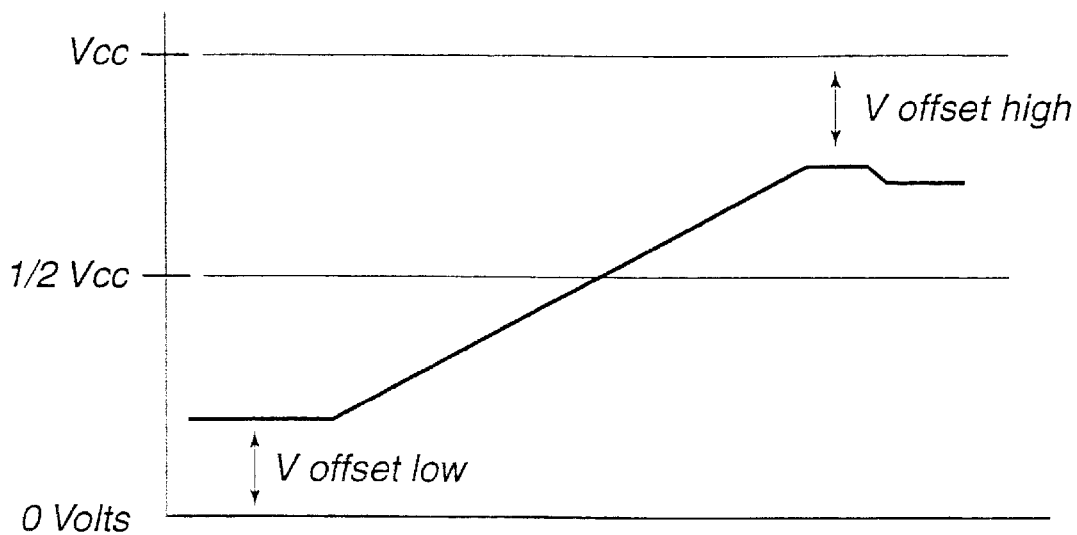
FIG. 8 is a graphical representation of the portions that are used in the algorithm to remove any sensor placement offsets during installation.

Referring to FIG. 8, the two offset voltages (V offset low, and V offset high) must be identified. This can be done during a calibration mode, after the sensors 12 are installed. A technician (or the end user), can put the electronics into calibration mode, and then press each key 10 individually. A microprocessor can then measure how high the sensor's output goes (V offset high), and what it is at rest (V offset low). Knowing these two values, and the required value of halfway (½ Vcc) yields a formula that can normalize the sensor's output.

First any low offset must be removed, so the sensor's output at rest will equal 0 volts. Then the resulting value must be multiplied by a normalizing figure to yield a full scale response. The formula is as follows:

Corrected data=(sensor data−V offset low)×(ideal fill range/actual full range)

Or referring to the graph in FIG. 8:

$$\text{Corrected data} = (\text{sensor data} - V \text{ offset low}) \times \frac{Vcc}{(V \text{ offset high} - V \text{ offset low})}$$

Figure 9:
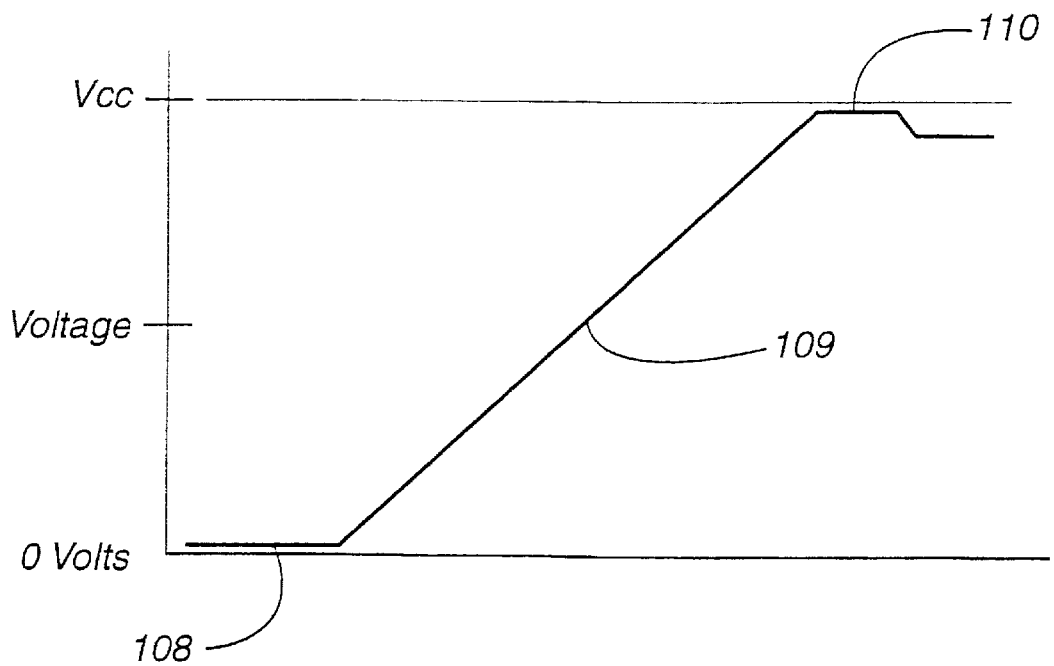
FIG. 9 is a graphical representation of the corrected and normalized sensor output after being adjusted by the algorithm.

Testing has shown this formula to work in normalizing all sensor data outputs. The error rate is small for small variations in sensor mounting, gradually increasing in error rate as the error in sensor mounting increases. The net effect though is that within reason, the sensor variations are corrected and normalized properly, giving a consistent output range from sensor to sensor. A normalized output curve (rest 108, midway 109, and fully depressed 110) is shown in FIG. 9.

This algorithm can be easily implemented in a microcontroller (not shown) or DSP that is monitoring the outputs of the sensors 12.

Figure 10A:
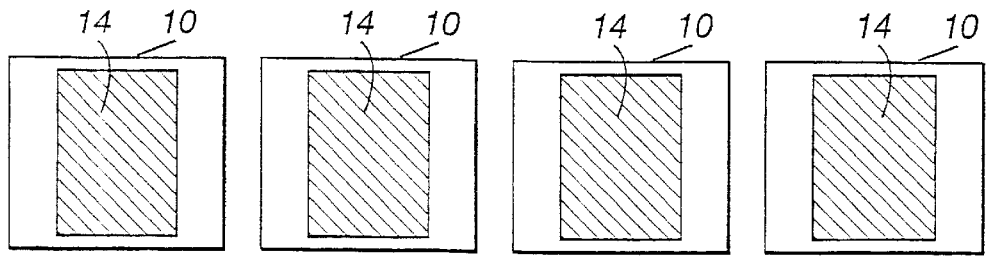
FIG. 10a shows a rear portion of several keys having magnets attached to them.
Figure 10B:
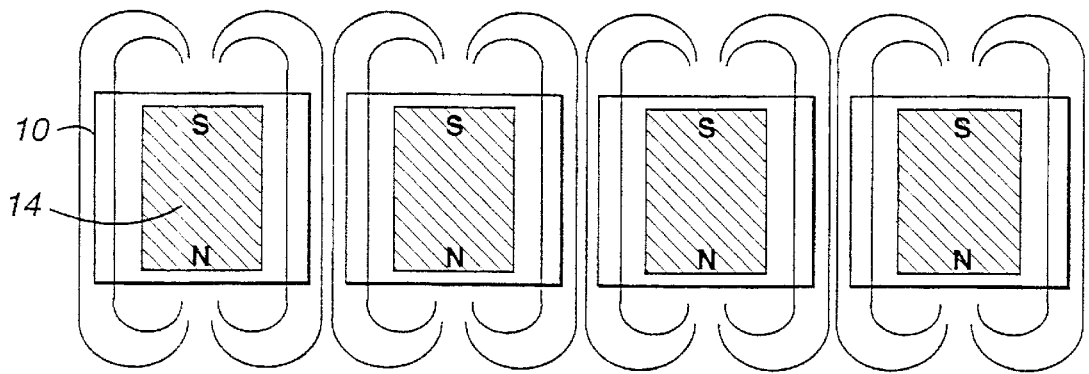
FIG. 10b shows the effect of the magnets adjacent to each other and the resultant magnetic flux which emanates onto adjacent keys.

Referring to FIG. 10a shows a plurality of keys 10, each with a magnet 14 mounted on the end. The multiple magnetic fields will create some cross-over (interference) into adjacent keys as shown in FIG. 10b. This can cause some adverse feel to the key as it moves, and possibly could be felt by the pianist when playing a key.

Figure 10C:
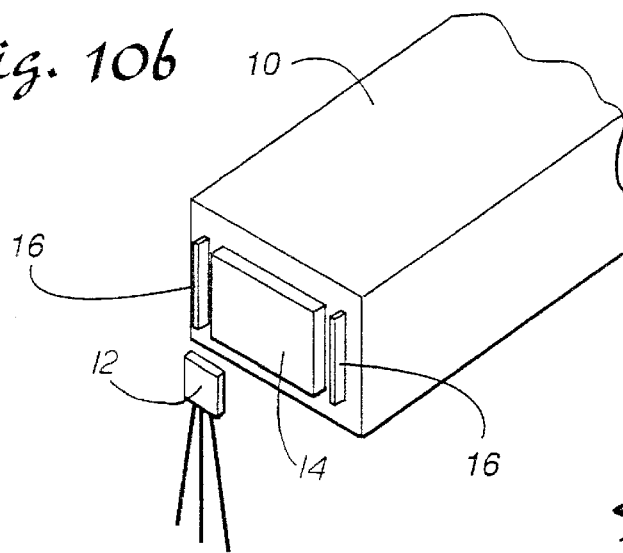
FIG. 10c is an illustration of magnet shields mounted adjacent the magnets in the preferred embodiment.
Figure 10D:
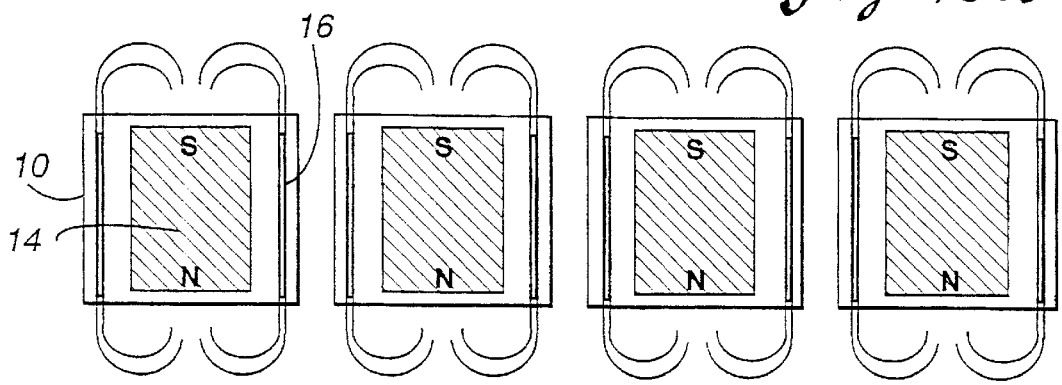
FIG. 10d shows the limiting influence of the magnetic shields on the magnetic flux.

To remedy this situation, a magnetic shield 16 (steel or other magnetically reactive metal) is put in place on one or both sides of the magnet 14 as shown in FIG. 10c. This shield 16 re-directs the magnetic flux by acting to channel the flux energy along the length of the shield as shown in FIG. 10d. The magnetic field outward towards the sensor 12 is only slightly reduced, but not enough to adversely affect the sensor and its output. The side to side cross over effect though is completely eliminated, so no adverse key effect remains.

The foregoing description of a preferred embodiment of the invention has been presented for purposes of illustration and description. It is not intended to be exhaustive or to limit the invention to the precise form disclosed. Obvious modifications or variations are possible in light of the above teachings. The preferred embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A keyboard operated musical instrument key motion sensing and recording apparatus, comprising:

a magnet attached to a rear surface of at least one key pivotally mounted to a bottom surface of said at least one key to a key bed supported by the instrument for movement upon actuation of the at least one key;

a magnetic sensor attached to the instrument and facing said magnet for sensing changes in polarity of said magnet throughout the movement of the at least one key without contact and producing electrical signals corresponding to the sensed polarity of said magnet and indicative of key position; and an electrical circuit for receiving said electrical signals produced by said magnetic sensor and determining a velocity of said at least one key, whereby key movement and velocity data for said at least one key may be recorded.

2. The key motion sensing and recording apparatus of claim 1, wherein said magnet maintains a substantially constant distance from said magnetic sensor and the movement of said magnet is in a substantially vertical direction.

3. The key motion sensing and recording apparatus of claim 1, wherein said magnet is at least substantially four millimeters wider than said magnetic sensor; and an edge of said sensor is positioned substantially directly opposite an edge of said magnet to accommodate side-to-side movement of said at least one key and said magnet.

4. The key motion sensing and recording apparatus of claim 1, wherein said electrical circuit includes an analog to digital converter for converting said electrical signal into a digital signal, a processor for determining the velocity of said at least one key, and a machine readable storage media for recording the key movement and velocity data.

5. A keyboard operated musical instrument key motion sensing and recording apparatus, comprising:

a magnet attached to a rear portion of at least one key pivotally mounted to a key bed supported by the instrument for movement upon actuation of the at least one key;

a magnetic sensor attached to the instrument and facing said magnet for sensing changes in polarity of said magnet throughout the movement of the at least one key without contact and producing electrical signals corresponding to the sensed polarity of said magnet and indicative of key position; and an electrical circuit for receiving said electrical signals produced by said magnetic sensor, determining a velocity of said at least one key, and calculating a correction factor based on an initial actuation of said at least one key and applying the correction factor to subsequent sensor outputs, said correction factor being dependent upon the placement of said magnet on said rear portion of said key and the distance between said magnet and said magnetic sensor, whereby key movement and velocity data for said at least one key may be recorded.

6. The key motion sensing and recording apparatus of claim 5 further comprising at least one magnetic shield attached to said rear surface of said at least one key adjacent said magnet for shielding magnets associated with adjacent keys from magnetic flux emanating from said magnet.

7. The key motion sensing and recording apparatus of claim 5, wherein said magnet maintains a substantially constant distance from said magnetic sensor and the movement of said magnet is in a substantially vertical direction.

8. The key motion sensing and recording apparatus of claim 5, wherein said magnet is at least substantially four millimeters wider than said magnetic sensor; and an edge of said sensor is positioned substantially directly opposite an edge of said magnet to accommodate side-to-side movement of said at least one key and said magnet.

9. A keyboard operated musical instrument key motion sensing and recording apparatus, comprising:

a plurality of magnets attached to a rear face of a plurality of keys pivotally mounted to a key bed for movement upon actuation of said keys;

a plurality of magnetic sensors supported by said instrument and facing said magnets for sensing changes in polarity of said magnets throughout the movement without contact and producing electrical signals corresponding to the sensed polarity and indicative of key position;

a processor for receiving said electrical signals produced by said magnetic sensors, determining a velocity of said keys dependent in part on said electrical signals, recording said electrical signals and the determined velocities of said keys, and determining a correction factor based on an initial actuation of each of said keys and applying the correction factor to subsequent sensor outputs, said correction factor dependent upon the alignment of and distance between said magnets and said sensors.

10. The key motion sensing and recording apparatus of claim 9, further comprising an analog to digital converter for converting said electrical signal into a digital signal, and a machine readable storage media for recording the key movement and velocity data.

11. The key motion sensing and recording apparatus of claim 9, wherein said magnet maintains a substantially constant distance from said magnetic sensor and the movement of said magnet is in a substantially vertical direction.

12. The key motion sensing and recording apparatus of claim 9, wherein said magnet is at least substantially four millimeters wider than said magnetic sensor; and an edge of said sensor is positioned substantially directly opposite an edge of said magnet to accommodate side-to-side movement of said at least one key and said magnet.

13. The key motion sensing and recording apparatus of claim 9 further comprising at least one magnetic shield attached to said rear portion of said at least one key adjacent said magnet for shielding adjacent keys from magnetic flux emanating from said magnet.

14. A keyboard operated musical instrument key motion sensing and recording apparatus, comprising:

a plurality of magnets attached to a rear face of a plurality of keys pivotally mounted to a key bed for movement upon actuation of said keys;

a plurality of magnetic sensors supported by said instrument and facing said magnets for sensing changes in polarity of said magnets throughout the movement without contact and producing electrical signals corresponding to the sensed polarity and indicative of key position;

a processor for receiving said electrical signals produced by said magnetic sensors, determining a velocity of said keys dependent in part on said electrical signals, recording said electrical signals and the determined velocities of said keys, and adjusting the output signals in accordance with a predetermined correction factor dependent upon the position of said magnet relative said sensor.

15. The key motion sensing and recording apparatus of claim 14, further comprising an analog to digital converter for converting said electrical signal into a digital signal, and a machine readable storage media for recording the key movement and velocity data.

16. The key motion sensing and recording apparatus of claim 14, wherein said magnet maintains a substantially constant distance from said magnetic sensor and the movement of said magnet is in a substantially vertical direction.

17. The key motion sensing and recording apparatus of claim 14, wherein said magnet is at least substantially four millimeters wider than said magnetic sensor; and an edge of said sensor is positioned substantially directly opposite an edge of said magnet to accommodate side-to-side movement of said at least one key and said magnet.

18. The key motion sensing and recording apparatus of claim 14, further comprising at least one magnetic shield attached to said rear portion of said at least one key adjacent said magnet for shielding adjacent keys from magnetic flux emanating from said magnet.

19. A method for determining a velocity of at least one pivotally supported key of a keyboard operated musical instrument comprising the steps of:

actuating movement of the at least one key;

sensing changes in polarity of a magnet attached to a rear portion of the at least one key throughout the movement;

producing output signals indicative of the sensed polarity of said magnet and indicative of key position;

adjusting the output signals in accordance with a predetermined correction factor dependent upon the position of said magnet relative said sensor;

processing the output signals in order to determine the velocity of said at least one key; and storing the velocity of said at least one key determined in said processing step in a memory.

* * * * *